United States Patent
Kojima et al.

(10) Patent No.: US 7,212,786 B2
(45) Date of Patent: May 1, 2007

(54) WIRELESS COMMUNICATION SYSTEM AND MICROCOMPUTER

(75) Inventors: Hirotsugu Kojima, Tokorozawa (JP); Atsushi Kiuchi, Higashimurayama (JP); Yuichi Takitsune, Kodaira (JP); Katsumi Yamamoto, Kokubunji (JP)

(73) Assignee: Renesas Technology Corporation, Tokyo (JP)

( * ) Notice: Subject to any disclaimer, the term of this patent is extended or adjusted under 35 U.S.C. 154(b) by 428 days.

(21) Appl. No.: 10/410,172

(22) Filed: Apr. 10, 2003

(65) Prior Publication Data

US 2004/0203389 A1    Oct. 14, 2004

(30) Foreign Application Priority Data

Apr. 26, 2002   (JP)   .............................. 2002-125685

(51) Int. Cl.
*H04B 7/00* (2006.01)
(52) U.S. Cl. .................. 455/41.2; 455/343.2; 340/7.32
(58) Field of Classification Search ............. 455/343.2, 455/41.2, 208, 265, 574; 340/7.32, 7.33; 370/311
See application file for complete search history.

(56) References Cited

U.S. PATENT DOCUMENTS 6,198,820 B1 *   3/2001   Tetsushi ..................... 379/413
6,473,607 B1 *   10/2002  Shohara et al. .......... 455/343.1
6,542,727 B1 *   4/2003   Kikuchi ..................... 340/7.33
6,725,067 B1 *   4/2004   Marx et al. ................. 455/574
6,728,234 B1 *   4/2004   Hofmann et al. .......... 370/350
6,768,725 B2 *   7/2004   Wakamatsu ................ 370/311
2002/0065117 A1 * 5/2002 Suda .......................... 455/574

FOREIGN PATENT DOCUMENTS

JP    10-215293    8/1998
JP    2000-244351  9/2000

* cited by examiner

*Primary Examiner*—Matthew D. Anderson
*Assistant Examiner*—Sanh Phu
(74) *Attorney, Agent, or Firm*—Mattingly, Stanger, Malur & Brundidge, P.C.

(57) ABSTRACT

Providing a wireless communication device that, even if clock stop of a radio frequency part is controlled by a baseband part operating on the same clock signal, can resume clock oscillation, and makes it easy to time the clock reactivation to other operations based on a shared clock. The wireless communication device comprises an RF part generating a first clock signal and a baseband part. The baseband part generates a second clock signal, controls the generation and stop of the first clock signal, uses the first clock signal to perform data processing and a clocking operation, and in a low power consumption state in which the first clock signal is stopped, uses the second clock signal to perform a timer operation and a clocking operation. The generation timing of the first clock signal can be generated by the timer operation using the second clock signal.

14 Claims, 17 Drawing Sheets

WIRELESS COMMUNICATION SYSTEM AND MICROCOMPUTER

BACKGROUND OF THE INVENTION

The present invention relates to a wireless communication device applicable to a wireless communication network, and more particularly to a microcomputer applied to a baseband part and the like of the wireless communication device. It relates to a technology effectively applied to Bluetooth communication devices forming, e.g., piconet.

Wireless communication devices such as Bluetooth communication devices, wireless LAN communication devices, and mobile communication devices have a radio frequency (RF) part for performing wireless communications and a baseband part for performing data processing. The RF part and the baseband part are not always operating. A mobile communication device disclosed in Japanese Unexamined Patent Publication No. 2000-244351, to reduce power consumption during intermittent receive waits, stops the oscillation operation of a high-accuracy clock generation circuit required for communications during a call wait, and resumes the oscillation operation by using a timing circuit operating on a clock signal of a low-frequency clock generation circuit of a clock circuit required to operate at all times. Also, a cellular phone disclosed in Japanese Unexamined Patent Publication No. Hei 10(1998)-215293 uses a circuit operating on an oscillation clock of a clock oscillator to resume the oscillation operation of an operation clock generation circuit of a CPU.

SUMMARY OF THE INVENTION

The inventor studied low power consumption of wireless communication devices such as Bluetooth communication devices forming a Bluetooth system. The Bluetooth system began standardization under the slogan of making cables wireless and presently allows communications of up to 732 Kbps (kilobits per second) at a close distance of about 10 m. Up to seven slave communication devices can be connected to one master communication device to form a network called piconet. Possible combinations of master communication device and slave communication device are personal computer and peripheral device, cellular phone and digital camera, and audio device and headset. The standard defines three low power consumption modes: park, hold, and sniff. In any of the modes, a master device and slave terminals that participate in a same piconet share a shared clock (virtual clock) called a Bluetooth clock (hereinafter referred to as a BT clock), whereby communication timing is controlled. The clock is a counter operating at 3.2 kHz (kilohertz); its accuracy must be kept within ±20 ppm during communications, but is relaxed to ±250 ppm in low power consumption modes (during standby).

In Bluetooth communication devices, a clock used in an RF part is defined so strictly that it must be kept within ±20 ppm of a specified frequency regardless of changes in environments such as humidity. The above described BT clock is generally used by frequency-dividing the communication clock signal. An operation clock signal of the baseband part is not defined so strictly; logical circuits may operate without tightness. It is economically undesirable that communication devices have many crystalline oscillators as clock sources. To reduce power consumption, it is desirable to stop a clock signal of the RF part during standby. To save the crystalline oscillators, it is natural to supply a clock signal of the RF part which has strict accuracy requirements to the baseband part. At this time, to reduce power consumption, a control signal for stopping the clock signal of the RF part is issued from the baseband part. However, there is a problem in that, since the supply of the clock signal from the RF part is stopped, a circuit for issuing a control signal for reactivating the clock signal cannot operate.

A good idea for solving this problem is to facilitate satisfying the system-specific requirements that terminals participating in a network share the BT clock based on which communication timing is controlled. As in the prior art of cellular phones as described previously, mere use of a low-speed clock oscillator typified by a man-machine interface clock to resume the oscillation of a clock signal has the difficulty in achieving the timing matching with various operations based on the shared clock, and as a result, new correction means must be added. Furthermore, Bluetooth communication devices require that the interval at which clock oscillation is restarted be variable in view of relations with low power consumption modes.

An object of the present invention is to provide a wireless communication device that, when a control signal for stopping a clock signal of an RF part is issued from a baseband part operating on the same clock signal as it, even if the supply of the clock signal from the RF part is stopped, can issue a control signal for reactivating the clock to the RF part, and makes it easy to time the clock reactivation to other operations based on a shared clock.

Another object of the present invention is to provide a wireless communication device that, when a control signal for stopping a clock signal of an RF part is issued from a baseband part operating on the same clock signal as it, even if the supply of the clock signal from the RF part is stopped, can issue a control signal for reactivating the clock to the RF part, and makes it easy to self-reliantly time the clock reactivation to a shared clock of a host wireless communication device.

Another object of the present invention is to provide a microcomputer that, when a control signal for stopping a clock signal of an RF part is issued, even if the supply of the clock signal from the RF part is stopped, can issue a control signal for reactivating the clock to the RF part, and makes it easy to time clock reactivation to other operations based on a shared clock.

The above and other objects, and novel features of the present invention will become apparent from the following description and the accompanying drawings.

Representative examples of the invention disclosed in the present patent application will now be briefly described.

[1] A wireless communication device applicable to a wireless communication network has an RF part 10 for performing wireless communications and a baseband part (11), interfaced to the RF part (10), for performing data processing. The network is a piconet (5) of Bluetooth system. The RF part generates a first clock signal CLK1. The baseband part generates a second clock signal CLK2, controls the generation and stop of the first clock signal, uses the first clock signal to perform data processing and a clocking operation, and in a low power consumption state in which the first clock signal is stopped, uses the second clock signal to perform a timer operation and a clocking operation. The generation timing of the first clock signal is generated by the timer operation.

The clocking operation, performed to provide synchronization for communications, is an operation for sharing a virtual clock between a master communication device and slave communication devices participating in the network. For example, in a Bluetooth system, a virtual clock is a BT clock (referred to as a shared clock). In concrete embodiments of the present invention, counters (24, 31) for performing the clocking operation are used.

According to the above described means, when a control signal for stopping the first clock signal of the RF part is issued from the baseband part, even if the supply of the first clock signal from the RF part to the baseband part is stopped, the baseband part can generate a generation timing of the first clock signal by a timer operation using the second clock signal. Furthermore, since the timer operation uses the second clock signal with which the clocking operation is performed, the clock reactivation can be easily timed to other operations based on the shared clock.

In a concrete embodiment of the present invention, the RF part has a temperature-compensated clock signal oscillation source (12) for generating the first clock signal. In a low power consumption mode in which communications and the like are idle, oscillation operation is stopped by the baseband part, to reduce the power consumption of the wireless communication devices. The baseband part has a clock oscillation source (23) for generating a second clock signal at a lower precision than the clock oscillator of the first clock signal.

In another embodiment of the present invention, the baseband part has a central processing unit (16) for performing the data processing, and the central processing unit operates in synchronization with an operation clock signal formed based on the first clock signal. The central processing unit has the economical advantage that it does not need to have an operation reference clock signal source of its own. Even in that case, as described above, a considerable amount of power consumption can be cut off in both the baseband part and the central processing unit in the low power consumption mode in which communications are idle.

In another embodiment of the present invention, the RF part has plural finite state transition control transistors (70) of wireless communication signal operation, and predetermined finite state transition control transistors can selectively store control information indicating stop of supply of the first clock signal to an internal circuit of the RF part. Thereby, the operation of the RF part can be stopped and only the baseband part can perform different interface operations and the like for the duration of the stop.

In another embodiment of the present invention, the baseband part has a timer (40) performing the timer operation, and has a register (42) for making a generation timing of the first clock signal by the timer variable; the register is accessible to the central processing unit. Thereby, according to the setting value of the register, the interval from the low power consumption state in which the first clock signal is stopped to the reactivation of the clock can be made variable.

In another embodiment of the present invention, the RF part starts the generation of the first clock signal in synchronization with a reset release by a reset signal (RES) inputted to a reset terminal. At this time, the baseband part is supplied with the reset signal, holds a reset indication by the reset signal in a holding means (55), and releases the held reset indication after the clock generation state of the first clock signal reaches a predetermined state. For example, the holding means is a counter that is initialized by the reset signal, counts clock changes of the first clock signal, and instructs an internal reset signal to release the reset when a count value reaches a predetermined value.

According to the above described means, in the case where the baseband part adopts the synchronous reset system that presupposes that a clock signal is stably supplied before reset release, even if the same reset signal as the RF part is supplied to the baseband part, it can be prevented that the baseband part malfunctions in the period during which the first clock signal oscillates unstably.

[2] A different aspect of the present invention focuses on a microcomputer such as a data processor constituting a baseband part of a wireless communication device applicable to a wireless communication network. A microcomputer 11 according to the present invention is a microcomputer put into a semiconductor integrated circuit that inputs a first clock signal (CLK1) from the outside and performs baseband processing for wireless communications; it has a central processing unit (16), baseband processing circuits (27, 24) connected to an RF part, a clock generation circuit (23), a clock control circuit (20), and a timer (40). The central processing unit operates with a clock signal generated based on the first clock signal as an operation reference clock signal. The clock generation circuit generates a second clock signal (CLK2). The clock control circuit outputs a control signal (CNT1) for controlling the generation and stop of the first clock signal. The baseband processing circuits use the first clock signal to perform a clocking operation, and when the first clock signal is stopped, use the second clock signal to perform a clocking operation. The timer, when the first clock signal is stopped, generates a generation timing of the first clock signal from the second clock signal, and affords the timing to the clock control circuit.

If the microcomputer is applied to wireless communication terminal devices such as Bluetooth communication devices, like the above, when a control signal for stopping the first clock signal is issued, even if the supply of the first clock signal from the outside is stopped, a generation timing of the first clock signal can be generated a timer operation using the second clock signal. Furthermore, since the timer operation uses the second clock signal with which the clocking operation is performed, the clock reactivation can be timed to other operations based on the shared clock. The central processing unit has the economical advantage that it does not need to have an operation reference clock signal source of its own.

By mapping a register for making a generation timing of the first clock signal by the timer variable into an address space of the central processing unit, the interval from a standby state at the time of stop of the first clock signal to the reactivation of the clock can be made variable according to the setting value of the register.

DETAILED DESCRIPTION OF THE PREFERRED EMBODIMENTS

Figure 2:
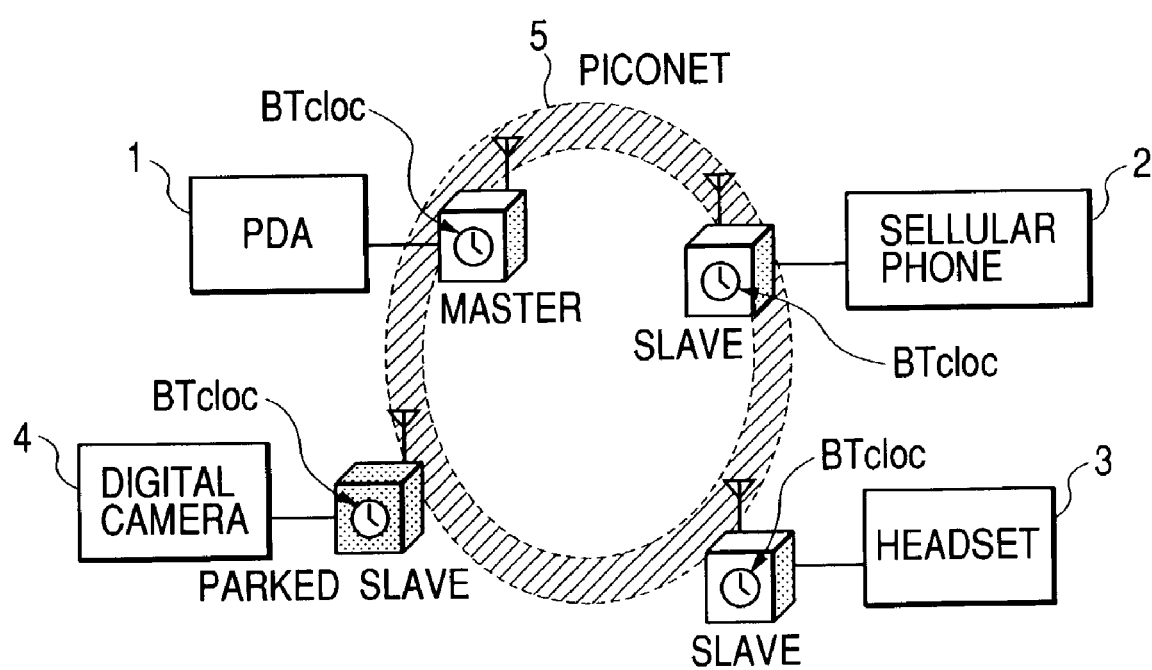
FIG. 2 is a diagram schematically showing a Bluetooth system.

First, the Bluetooth standard will be briefly described. FIG. 2 schematically shows a Bluetooth system. The figure schematically shows mutual connections among PDA (Personal Digital Assistant) 1, cellular phone 2, headset 3, and digital camera 4 over a Bluetooth network (simply referred to as piconet) 5. PDA 1 is connected as a master, and a total of three slaves, with the cellular phone 2 and headset 3 as active slaves and the digital camera 4 as a parked slave, are connected. To one piconet 5, for one master, a maximum of seven active slaves and a maximum of 255 parked slaves can be connected. From a master, active member addresses are issued to active slaves, and park member addresses are issued to parked slaves, and they are managed by the master. The communication devices within the piconet 5 are time-managed by a shared clock called Bluetooth clock (BT clock), based on which communications are synchronized. Parked slaves such as the digital camera 4 also have a BT clock synchronous with the master, based on which control is performed over communication timing for state transition such as a return to an active state.

Figure 3:
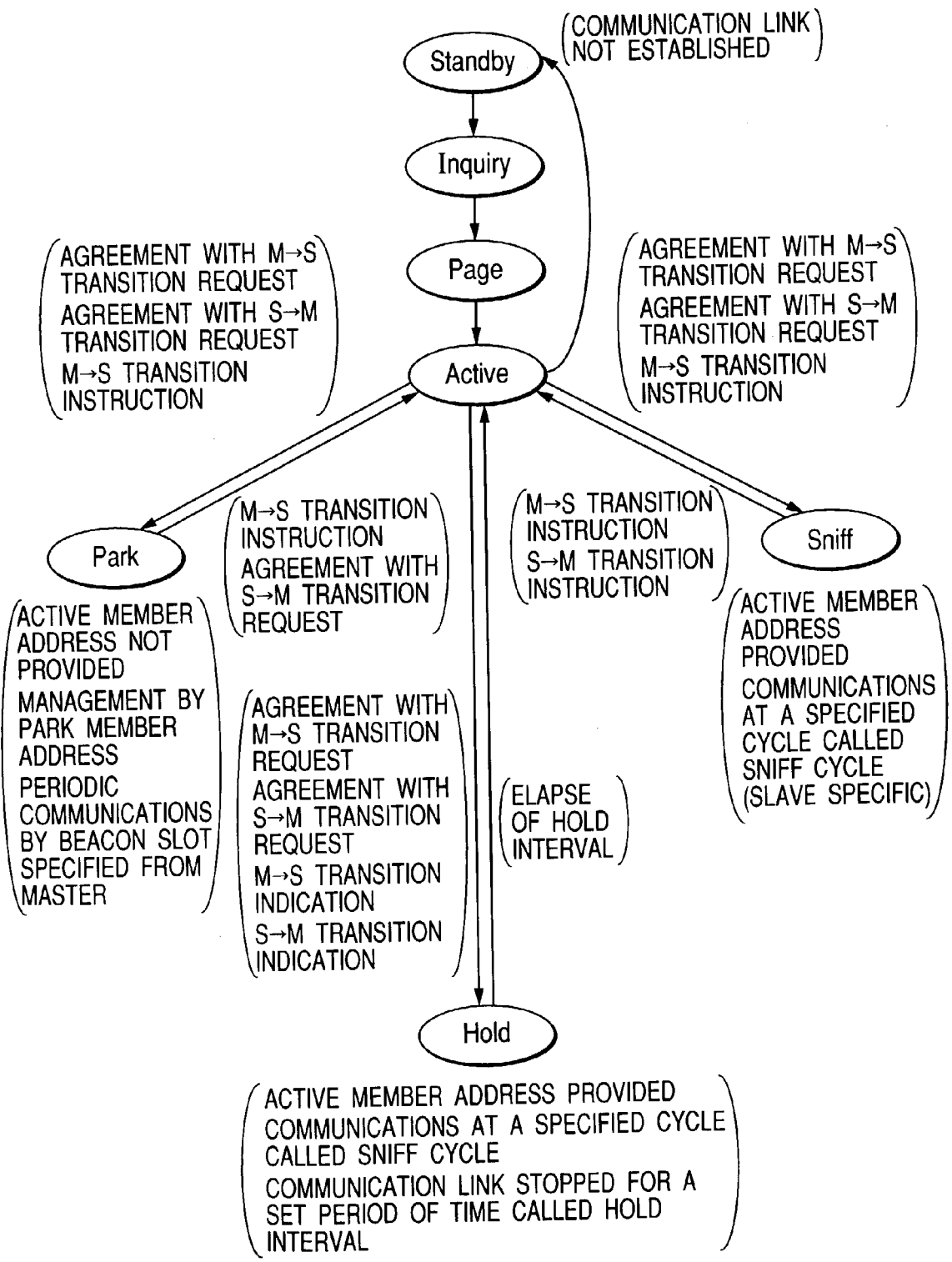
FIG. 3 is a diagram showing transition of control states in a Bluetooth wireless communication terminal (Bluetooth device)

FIG. 3 shows state transition of a Bluetooth wireless communication device. The communication device shits from a standby state having no communication link, via an inquiry state and a page state, to an active state in which a communication link is established. At this point, the communication device acquires an active member address and establishes a communication link. The low power consumption mode has three types of park, hold, and sniff, which may be differently used for different purposes. The park state is a state in which communications are idle in principle; instead of an active member address being returned to a master, a park address is issued. Communications are cyclically performed through a beacon slot specified from the master. When a need for communications occurs in the master or slave, it issues a request to return to an active member and performs actual communications. In the example of FIG. 2, the digital camera 4 is in the park state because it does not need to perform communications except when it transmits shot pictures. In FIG. 3, M designates a master, S designate a slave, and the arrow designates the direction of a request and instruction. When a state transition request occurs in the master or slave, it makes state transition after issuing a request or instruction to the party. Since there is a limitation of a maximum of seven active members, requests are not always satisfied.

The hold state stops a communication link for a set period of time; it does not occur cyclically. An active member address remains held. In the example of FIG. 2, in the case where the parked digital camera 4 is to return to the active state to rapidly transmit high volumes of image date to the PDA1, the PDA1 serving as a master requests the cellular phone 2 and headset 3 to shift to the hold state and relinquish a communication channel.

The sniff state is a mode in which communications are performed in a given cycle, with an active member address held; it is a mode corresponding to intermittent reception of the cellular phone 2. In the example of FIG. 2, this mode is effective in the case where the headset 3 free of voice is to be put in the low power consumption state in a state of unpredictable input of voice. This is because establishing a Bluetooth communication link with the headset 3 after the cellular phone 3 is called takes too long (tens of seconds) for the calling party to wait, and keeping the Bluetooth link established causes almost the same battery consumption as when communications are in progress.

Figure 4:
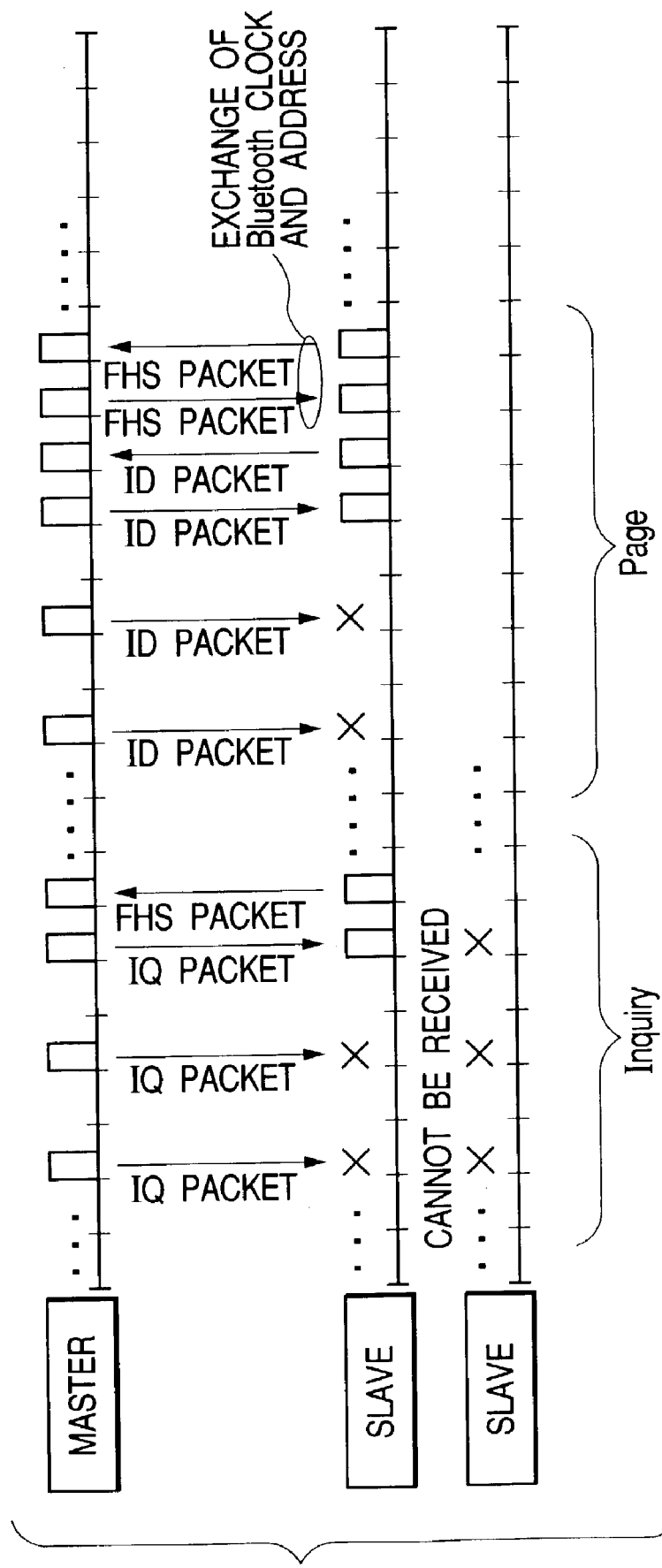
FIG. 4 is a diagram showing a procedure for establishing communications between Bluetooth wireless communication terminals and a method of synchronizing BT clocks.
Figure 5:
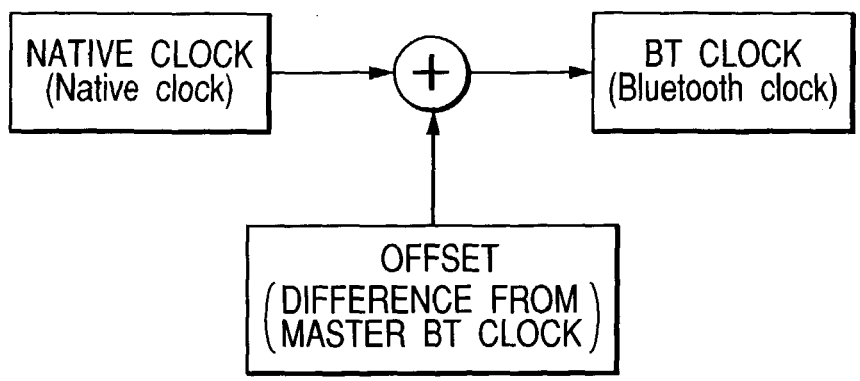
FIG. 5 is a diagram for explaining a basic concept of forming a BT clock from a native clock specific to a Bluetooth wireless communication terminal.

FIG. 4 shows a procedure for establishing a Bluetooth communications and a method of synchronizing BT clocks. In the inquiry state, a master broadcasts an IQ packet to all slaves that may exist adjacently (in this point, the master does not know what devices exist adjacently). From slaves receiving it, an FHS packet indicating its reception is returned. Thereafter, the system enters the page state in which FHS packets are sent from the master, and BT clock and Bluetooth address are exchanged. The BT clock provides synchronization for communication by matching the slaves to the master. That is, as shown in FIG. 5, by giving the difference between the time of native clocks specific to individual devices and the time of the BT clock of the master to the native clocks as offset, the native clocks operate as the BT clock in the piconet. After the BT clocks are synchronized, the system enters the active state. According to the Bluetooth standard, a BT clock operates in steps of 312.5 μs (3.2 kHz) and is required to have a frequency accuracy as high as ±20 ppm in a communication state, but the frequency accuracy is relaxed to ±250 ppm in the low power consumption mode.

Thus, in communication protocols complying with the Bluetooth standard, BT clocks must be synchronized between a master and slaves to decide a next communication opportunity; furthermore, diverse low power consumption power modes in addition to simple intermittent reception exist in the standard, and reactivation from the low power consumption mode must also be flexibly managed. In this point, control of return from the modes is different from control of return from the low power consumption mode during intermittent reception waits in mobile communication terminal equipment such as cellular phones.

Figure 1:
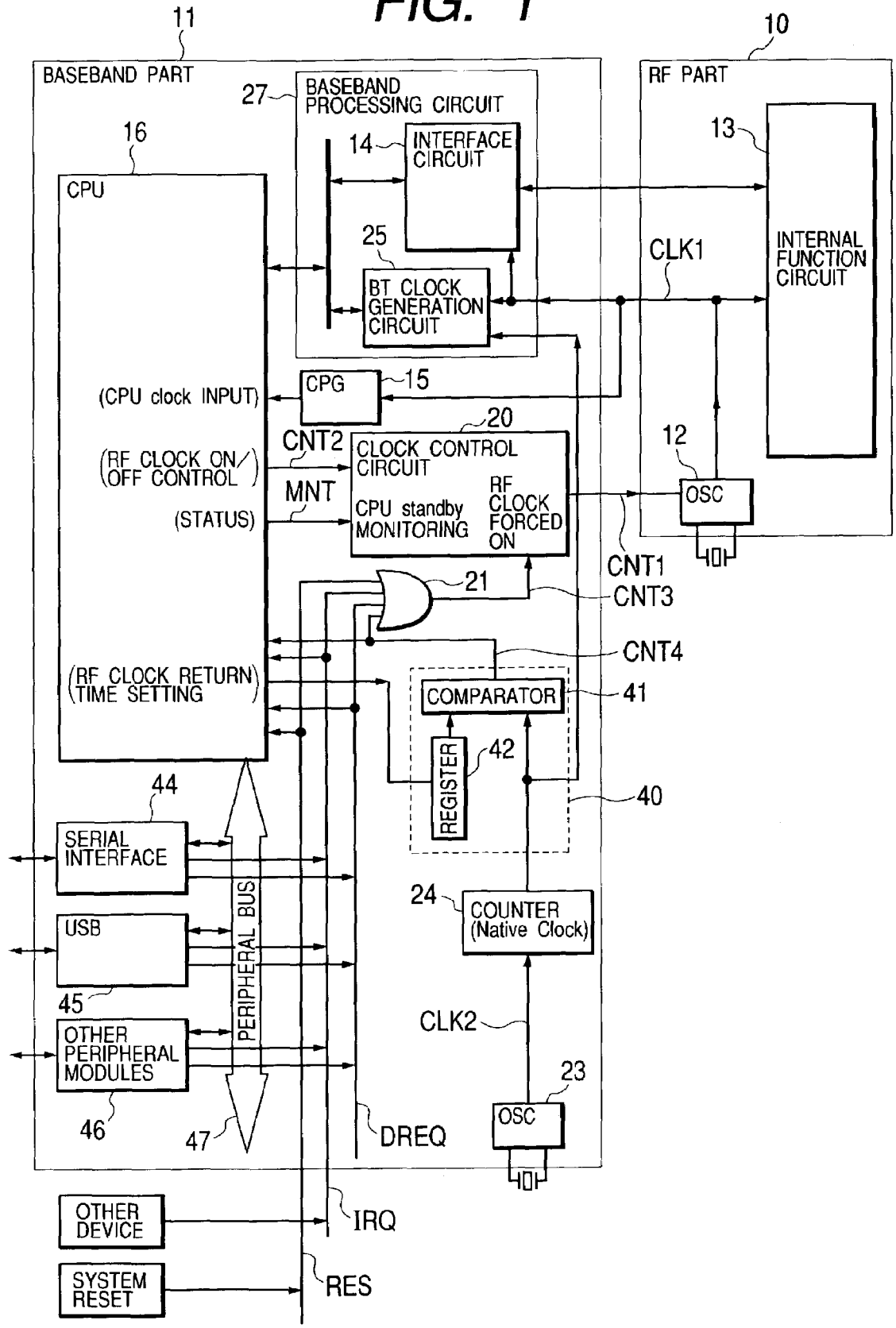
FIG. 1 is a block diagram showing the configuration of a Bluetooth communication device using an RF part and a baseband part as one example of a wireless communication device according to the present invention.

FIG. 1 shows the configuration of a Bluetooth communication device using an RF part and a baseband part as one example of a wireless communication device according to the present invention. Though there is no particular limitation, the RF part 10 is configured as an IC module (RF-IC) and the baseband part 11 is configured as LSI (baseband LSI) such as a microcomputer. The baseband part is formed on one semiconductor board (chip) such as, e.g., monocrystalline silicon by CMOS integrated circuit manufacturing technology.

An oscillator circuit (OSC) 12 to which a crystal oscillator is connected is provided in the RF part 10 is provided, and supplies a clock signal (first clock signal) CLK1 to an internal function circuit 13 for sending and receiving. At the same time, the clock signal CLK1 is supplied to the baseband part 11. The baseband part 11 is provided with an interface circuit 14 for inputting and outputting data and control signals to and from the RF part 10. The interface circuit 14 receives the clock signal CLK1 outputted from the RF part 10 by the interface circuit to use it as a synchronous control signal for inputting and outputting data and control signals to and from the RF part 10.

The clock signal CLK1 is also supplied as an operation clock of the CPU (central processing unit) 16 of the baseband part 11. In other words, the clock signal CLK1 is multiplied to a frequency required to achieve the processing capability of the CPU 16 by a clock pulse generator (CPG) 15 and supplied to the CPU 16. Therefore, the baseband part 11 does not need to independently have a source of supplying an operation clock signal of the CPU 16, as a result of which costs are reduced.

The baseband part 11 has the clock control circuit 20. The clock control circuit 20 controls the oscillator circuit 12 so as to generate and stop the clock signal CLK1. That is, when power to the oscillator circuit 12 is on, oscillation stop and resumption can be controlled by opening and closing its oscillation loop. The control is performed by a control signal CNT1 outputted from the clock control circuit 20. Switching between oscillation stop and resumption may be made by controlling a power switch of the oscillation circuit.

An indication to generate or stop the clock signal CLK1 is given from the CPU 16 to the clock control circuit 20 by a control signal CNT 2. For example, the CPU 16 directs the clock to be stopped before sleep. Particularly, if the oscillation of the first clock signal CLK1 is stopped, the operation clock signal of the CPU 16 is also lost. If the operation clock of the CPU 16 is lost early in terms of timing, there is the fear that the issuance and execution of an instruction to cause the CPU 16 to shift to a low power consumption mode such as standby mode are not complete. Accordingly, when a request to stop the clock is issued to the clock control circuit 20, the clock is actually stopped after it is recognized by a state monitor signal MNT outputted from the CPU 16 that the CPU 16 has shifted to the standby state. If the state monitor signal MNT is not outputted from the CPU 16, a proper delay time may be provided between a stop request and a stop indication.

Furthermore, the clock control circuit 20 is designed to forcibly resume the generation of the clock signal CLK1 by requests from other than the CPU 16 such as reset indication by the reset signal RES, interrupt by an interrupt request signal IRQ, and DMA transfer request by a DMA transfer request signal DREQ. In the drawing, the reset signal RES, interrupt request signal IRQ, and DMA transfer request signal DREQ are high active signals, which are inputted to an OR logical gate 21 and command the clock control circuit 20 to start generating of the clock signal CLK1 by a high level of a control signal CNT3 outputted from the OR logical gate 21.

The baseband part 11, to form the BT clock, has an oscillator circuit (OSC) 23 for generating a low-frequency clock signal CLK2 as a second clock signal and a counter 24 as clocking means. The counter 24 is constituted by a binary counter of e.g., 28 bits for inputting and counting the clock signal CLK2. The counter 24 serves as the native clock.

Output of the counter 24 as a native clock is supplied to a BT clock generation circuit 25. For the output of the native clock, the BT clock generation circuit 25 adjusts an offset from the BT clock as a master and generates a slave BT clock. Since the Bluetooth standard describes that ±250 ppm generally suffices for clocks of low power consumption mode, the oscillator circuit 23 of FIG. 1 cannot generally satisfy the oscillation circuit accuracy ±20 ppm of communication-time clocks. In this case, a communication-time native clock that operates in synchronization with a clock signal generated by frequency-dividing the high-accuracy clock signal CLK1 inputted from the RF part 10 is provided separately in the BT clock generation circuit 25 so that both the native clocks are used differently between communication time and the low power consumption mode. The BT clock generation circuit 25 and the interface circuit 14 constitute the baseband processing circuit 27.

In FIG. 1, the baseband part 11 has a timer 40 for generating a generation resumption timing of the clock signal CLK1. The timer 40 has a register 42 and a comparator 41 disposed in the address space of the CPU 16. When being into a sleep state, the CPU 16 stores the time of clock oscillation resumption in the register 42 before stopping the clock signal CLK1. The comparator 41 compares a time set in the register 42 with an output time of the native clock 24, and if they match, asserts the control signal CNT4. The active control signal CNT4 directs the clock control circuit 20 to resume the generation of the clock signal CLK1 and issues an interrupt request to the CPU 16.

A serial interface 44, USB (Universal Serial Bus) 45, and other peripheral module 46 are connected to a peripheral bus 47 of the CPU 16.

Figure 6:
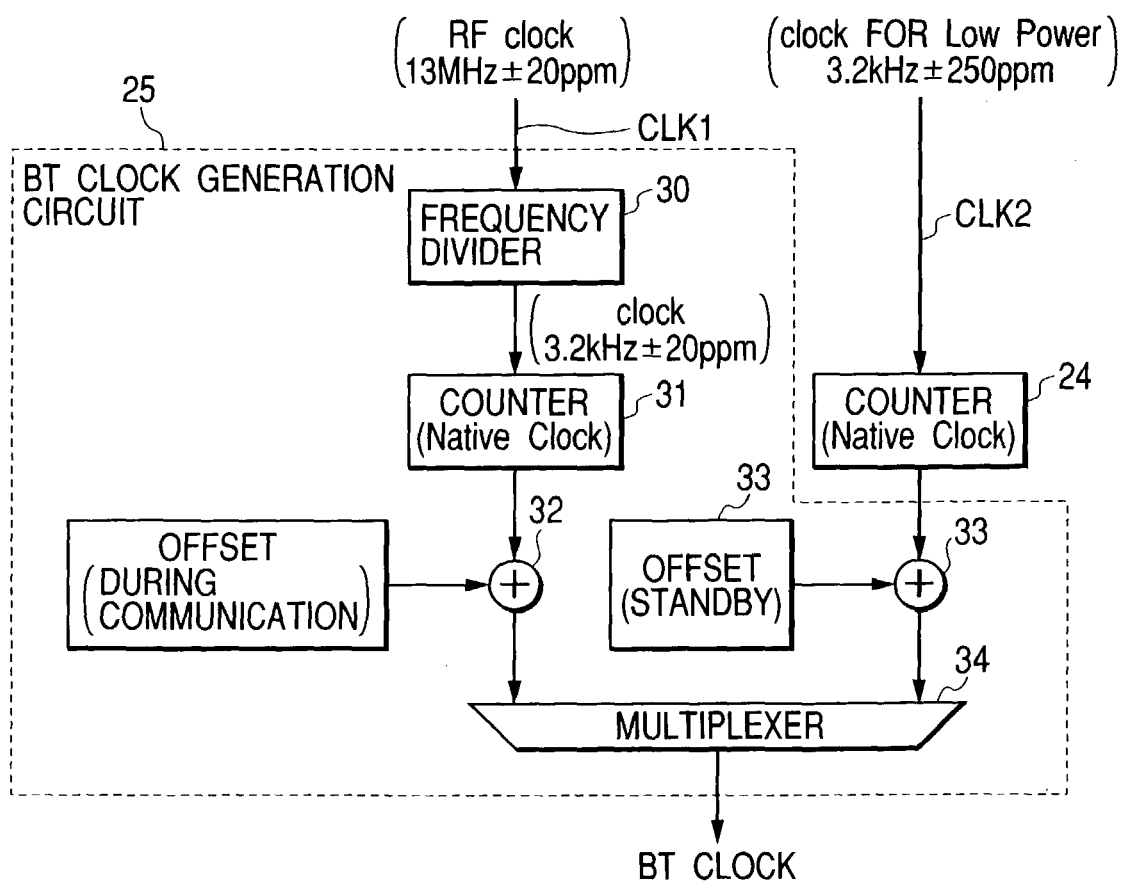
FIG. 6 is a block diagram showing a BT clock generation circuit.

FIG. 6 shows an example of the BT clock generation circuit 25. The clock signal CLK1 is frequency-divided by a frequency divider 30 and a counter 31 is provided as clocking means for counting frequency-divided clock signals. The counter 31 is a 28-bit binary counter like the counter 24. The counter 31 forms another native clock described previously. A time clocked by the counter 31 is added by an adder 32 with an offset, which is a difference from the master BT clock during communications. A time clocked by the counter 24 is added by an adder 33 with an offset, which is a difference from the master BT clock during standby. Output of the adders 32 and 33 is selected by a multiplexer 34, and the selected time is used as the time of a BT clock of a slave concerned.

A circuit for generating a BT clock may be simple as shown in FIG. 5. As described previously, the frequency accuracy of a clock for operating a native clock is required to be as high as ±20 ppm in a communication state, but the frequency accuracy is relaxed to ±250 ppm in the low power consumption mode. In this example, to satisfy the accuracy requirement in the communication state, the frequency 13 MHz ±20 ppm of the first clock signal CLK1 as an RF clock is divided by the frequency divider 30 to generate 3.2 kHz ±20 ppm, and the frequency-divided clock signal is supplied to the 28-bit counter 31 for a communication-time native clock. Since the generation of the first clock signal CLK1 is stopped to reduce power consumption in the park state in which communications are idle, the native clock is also stopped. Accordingly, a clock signal of 3.2 kHz ±250 ppm continuing to operate also when the first clock signal CLK1 is stopped is supplied to the another 28-bit counter 24, which is used as a native clock during standby. One of the communication-time native clock and the standby native clock is selected by the multiplexer 34 for use.

The native clocks may be corrected using offsets in a manner that adjusts both offsets so as to synchronize with the master BT clock afforded from the master, as described above. As another method, a difference between a BT clock value calculated from the communication-time native clock before stopping the first clock signal CLK1 and a BT clock value calculated from the standby native clock may be afforded to an offset value of the standby native clock. After both the native clocks are corrected to have the same value, one of them is selected by the multiplexer 34 and the BT clock of the standby native clock is made effective. Thereafter, the first clock signal CLK1 (RF clock) is stopped. Since a BT clock is already operating with the 3.2-kHz clock signal that is not stopped, there is no problem with reactivation. After reactivation, an offset for the communication-time native clock is adjusted to match the value of a BT clock calculated from the standby native clock, and when they have had the same value, switching is made.

Figure 7:
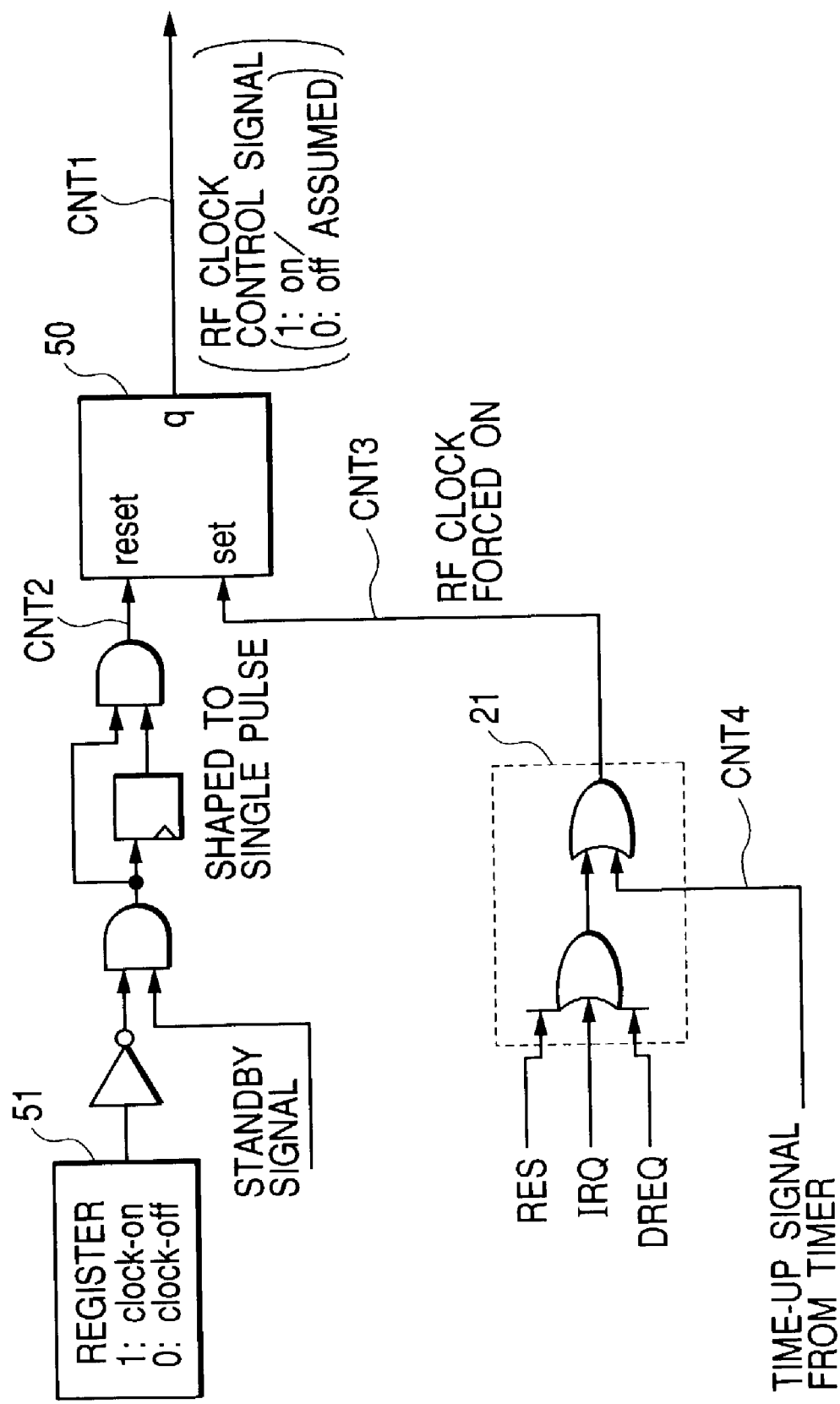
FIG. 7 is a block diagram showing a clock control circuit.
Figure 8:
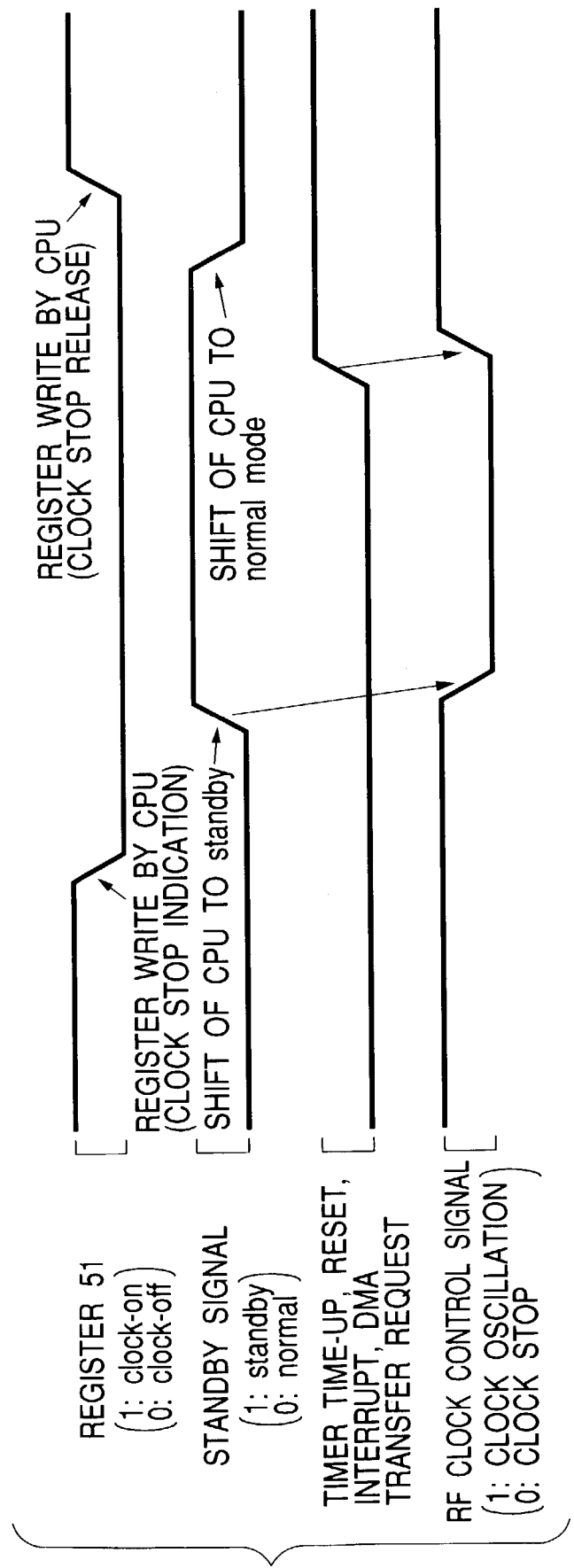
FIG. 8 is a timing chart showing the operation timing of FIG. 7.

FIG. 7 shows details of the clock control circuit 20. FIG. 8 shows the timing of operation of the clock control circuit 20. The clock control circuit 20 has a set/reset-type RS flip-flop 50 to generate and stop (turn on and off) the clock signal (RF clock) CLK1. Clock generation indication is made by the signal CNT1 (RF clock control signal) for controlling the generation and stop of the clock signal CLK1 when the RS flip-flop 50 is in the set state. A condition for achieving this is to obtain reset indication by the reset signal RES, interrupt request by the interrupt signal IRQ, transfer request by the DMA transfer request signal DREQ, or match detection by output CNT4 of the timer 40. Clock stop indication by the RF clock control signal CNT1 is made when the RS flip-flop 50 is in the reset state. A condition for achieving this is that the CPU 16 sets in advance a value (=0: clock off) denoting clock stop (clock off) in a predetermined control bit of a control register 51 and a signal CNT2 shaped to be a single pulse on the rising edge of a standby signal to rise is formed. The register 51 may be specified so that the predetermined control bit is set to 1 by reset processing; in this case, the operation of initialization by hardware can be eliminated.

Figure 9:
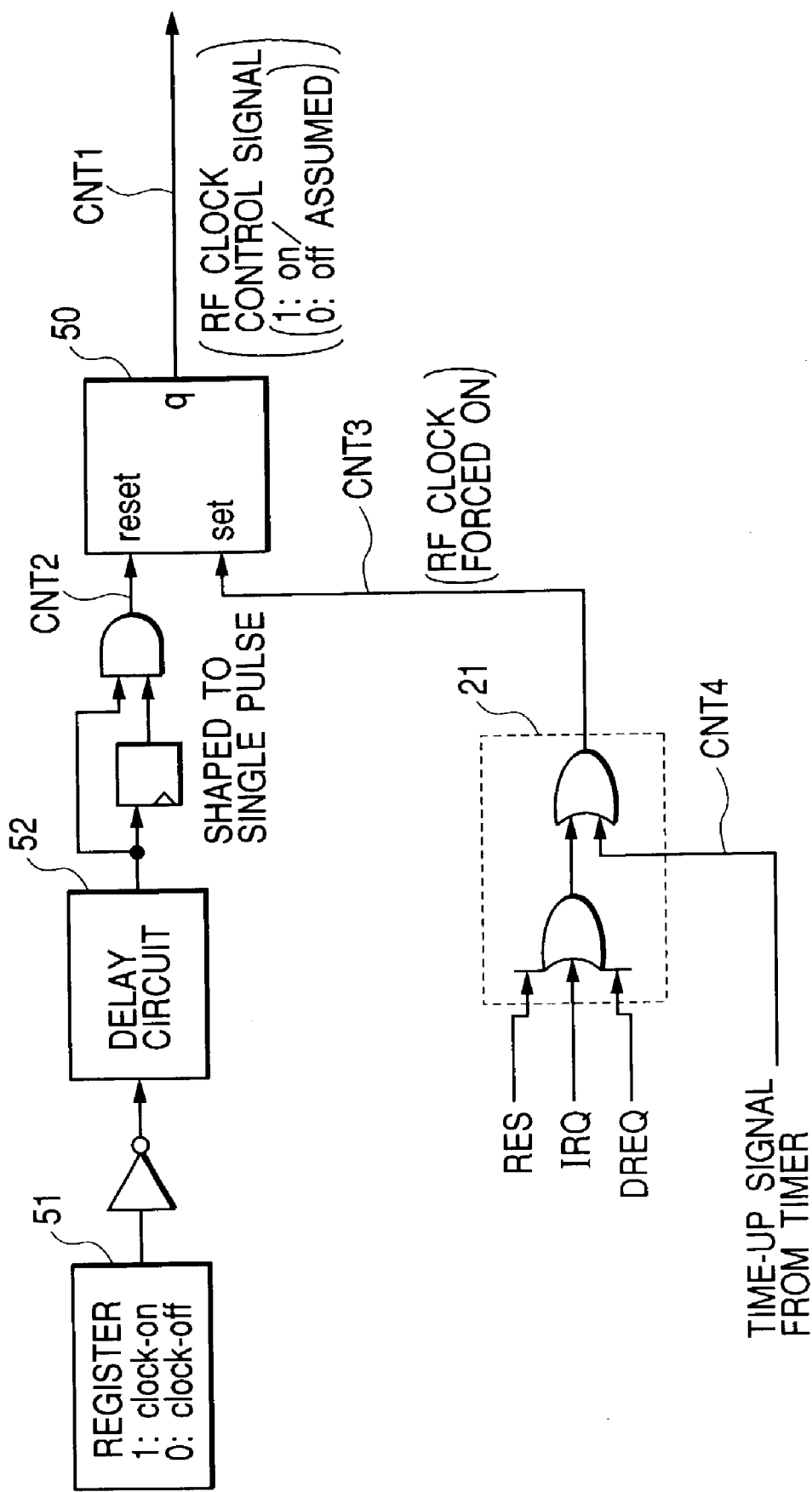
FIG. 9 is a block diagram showing another example of the clock control circuit.
Figure 10:
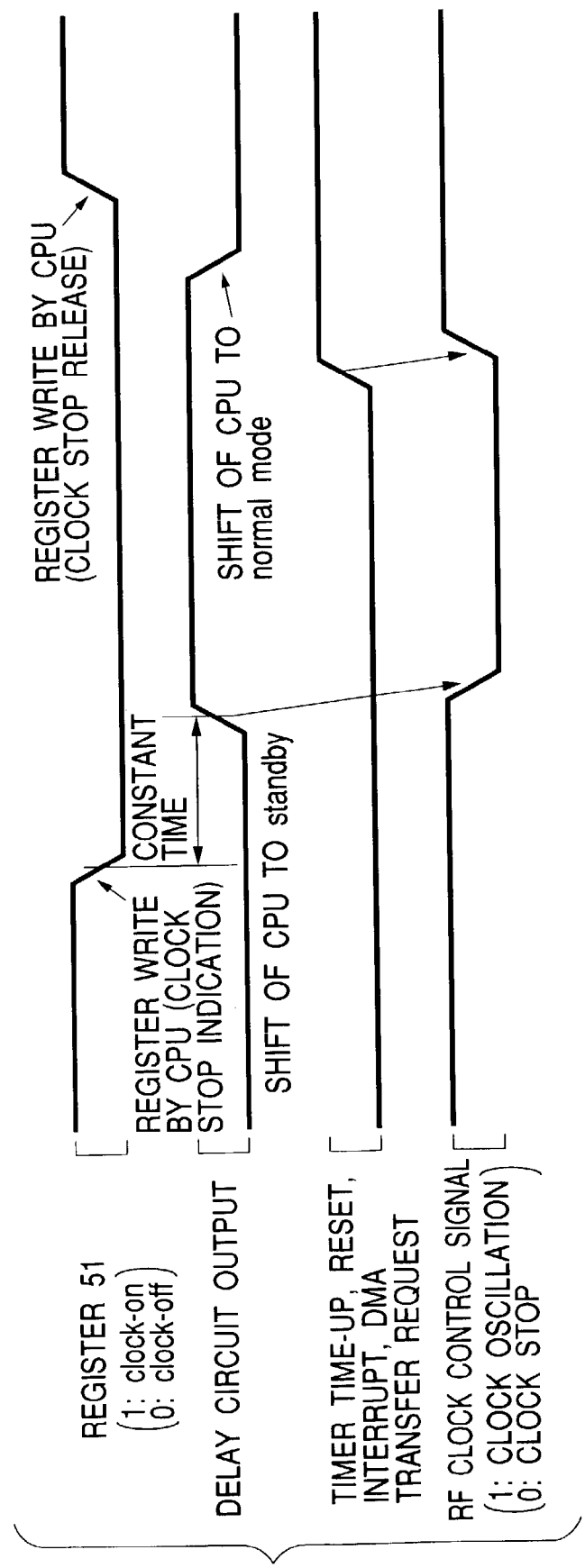
FIG. 10 is a block diagram showing the operation timing of the clock control circuit of FIG. 9.

FIG. 9 shows another example of the clock control circuit 20. FIG. 10 shows the operation timing of the clock control circuit of FIG. 9. The example of FIG. 7 enables clock stop control after waiting for issuance of a standby signal outputted from the CPU 16, while the example of FIG. 9 enables clock stop control by producing a delay of several tens of cycles in a delay circuit 52 after setting a control bit for clock stop control in the register 51. This configuration is particularly effective in the case where a CPU is used to which a state monitor signal or status signal for recognizing the standby state is not outputted.

Figure 11:
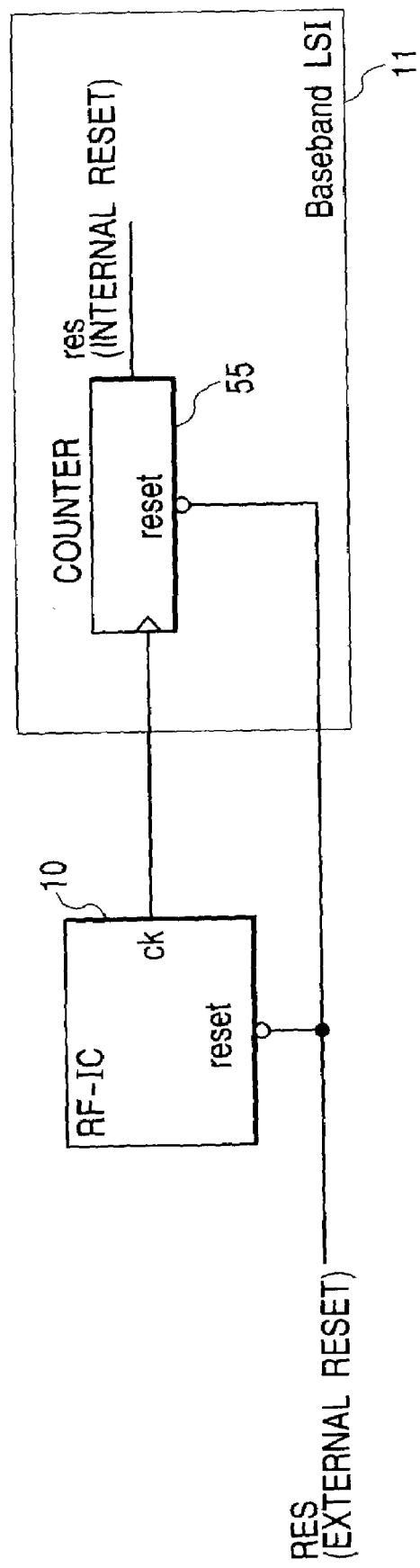
FIG. 11 is a block diagram showing a reset circuit effective when the baseband part is of a synchronous reset design.
Figure 12:
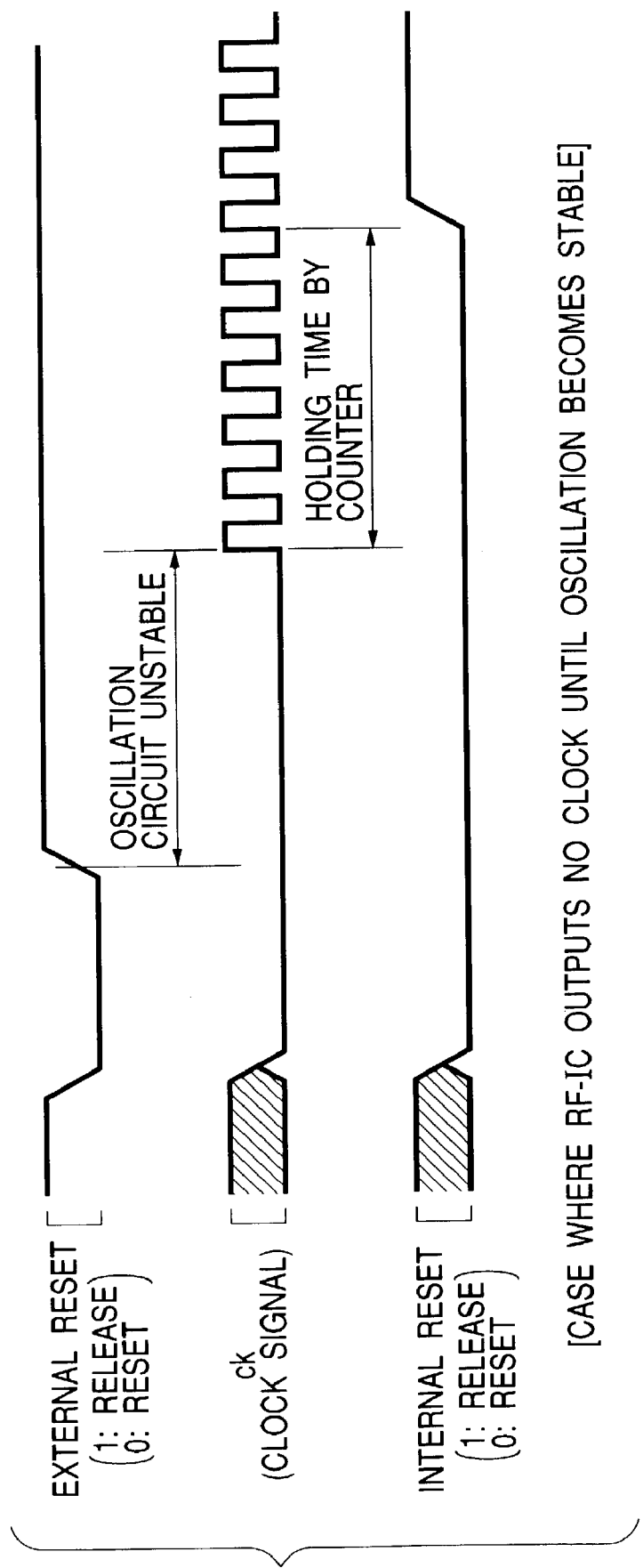
FIG. 12 is a timing chart explaining the operation of a reset circuit in the case where clock output is suppressed until the RF part supplying a clock becomes stable in oscillation.
Figure 13:
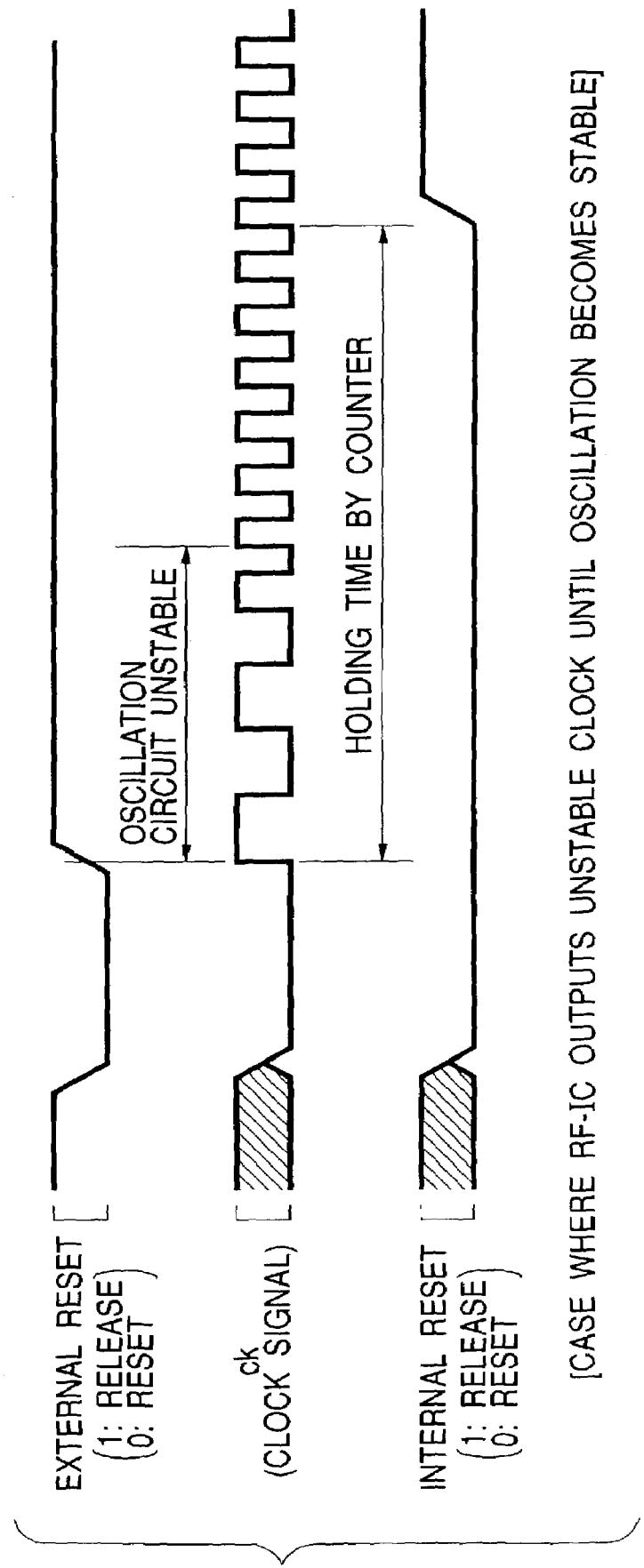
FIG. 13 is a timing chart showing the operation of the reset circuit in the case where clock output is performed in an unstable oscillation period.

FIG. 11 shows a reset circuit effective when the baseband part 11 is of a synchronous reset design. FIGS. 12 and 13 are timing charts explaining the operation of the reset circuit of FIG. 11; FIG. 12 shows the operation of the reset circuit in the case where clock output is suppressed until the RF part 10 supplying a clock becomes stable in oscillation, and FIG. 13 shows the operation of the reset circuit in the case where clock output is performed in an unstable oscillation period.

In this example, the RF part 10 starts clock oscillation after an external reset signal is released. On the other hand, logical circuits such as the CPU within the baseband 11 often adopts the synchronous reset system designed with the expectation that a clock is supplied during resetting. If a same reset signal is supplied to the RF part 10 and the CPU of the synchronous reset system, a stable clock signal could not be supplied to circuits of the synchronous reset system such as the CPU during resetting. Accordingly, as shown in FIG. 11, when an external reset signal RES is asserted, a counter is reset and output of the counter 55 is used as an internal reset signal res. Although the timing of releasing the reset depends on the count value of the counter 55, since the counter 55 counts clock signals ck supplied from the outside, the internal reset signal is held until the clock signals ck are supplied as many cycles as determined by the counter. As the holding period, the number of cycles until an initial state is completely propagated to internal circuits designed by the synchronous reset system may be adopted. Although FIGS. 12 and 13 are the same in that the period of holding the internal reset signal res is determined by the counter 55, count values must be adequately adjusted for the respective cases to provide a function for suppressing an unstable oscillation period. In the case of FIG. 12, a count value may be relatively small, while, in the case of FIG. 13, a count value is relatively large. For example, the counter 55, when reset, is preset to a predetermined value and successively decremented in synchronization with clocks, and when a count value becomes 0, the internal reset signal res is changed to a reset release level.

The overall operation of the Bluetooth system will be described. The operation will be described in terms of broad categories, system reset, shift to low power consumption state, and restoration from the low power consumption state.

In the system reset operation, when a reset signal is issued, the CPU 16 is reset, and at the same time the oscillator circuit 12 is forced to oscillate a clock through the clock control circuit 20. The RF part 10 starts clock oscillation and starts to supply the clock signal CLK1 to the baseband part 11. The CPU 16 sets the oscillation start (clock on) of the clock signal CLK1 for the clock control circuit 20. The clock may also be turned in the reset state. The CPU 16 shifts to normal operation from the reset sequence. Although the reset signal RES from the outside being released is a condition for clock oscillation start in the RF part 10, most existing CPUs adopt the synchronous reset system as described previously and expect a clock signal to be supplied during resetting.

A shift to the low power consumption state is started upon receipt of an indication for a shift from a normal operation state to the low power consumption state, that is, input defined in advance in the standard, such as a user's operation and command from a communication party through the RF part 10. Thereby, normal processing for shifting to the low power consumption state is performed. The CPU 16 sets information of time required to return from the low power consumption state in the register 42 of the timer 40 operating on a low-frequency clock. The CPU 16 sets clock stop indication of the RF part 10 in the clock control circuit 20. As described previously, the clock control circuit 20 does not output a clock stop signal to the RF part 10 immediately after the setting of the register. First, the CPU 16 shifts to the low power consumption state. After detecting by a status signal that the CPU 16 has shifted to the low power consumption state, the clock control circuit 20 outputs a signal for stopping the clock signal CLK1 to the RF part 10 by the control signal CNT1. Thereby, the RF part 10 stops clock oscillation of the clock signal CLK1 and stops the supply of the clock signal CLK1 to the baseband part 11.

The timer 40 operating on a low-frequency clock, if it matches a time set in advance in the register 42 at the time of return from the low power consumption state, issues a request signal for clock signal oscillation resumption to the clock control circuit 20 and issues an interrupt request to the CPU 16. The return is triggered not only at the timing of time-up of the timer 40 but also upon input of signals for returning the microcomputer from the standby state, such as reset, interrupt, and DMA transfer request. Thereby, the clock control circuit 20 affords an indication to resume the oscillation of the clock signal CLK to the RF part 10 by the control signal CNT1. Thereby, the RF part 10 starts oscillation of the clock signal CLK1 and starts the supply of the clock signal to the baseband part 11. When the supply of the clock signal CLK1 has been started, the CPU 16 starts interrupt processing and returns to normal operation.

Figure 14:
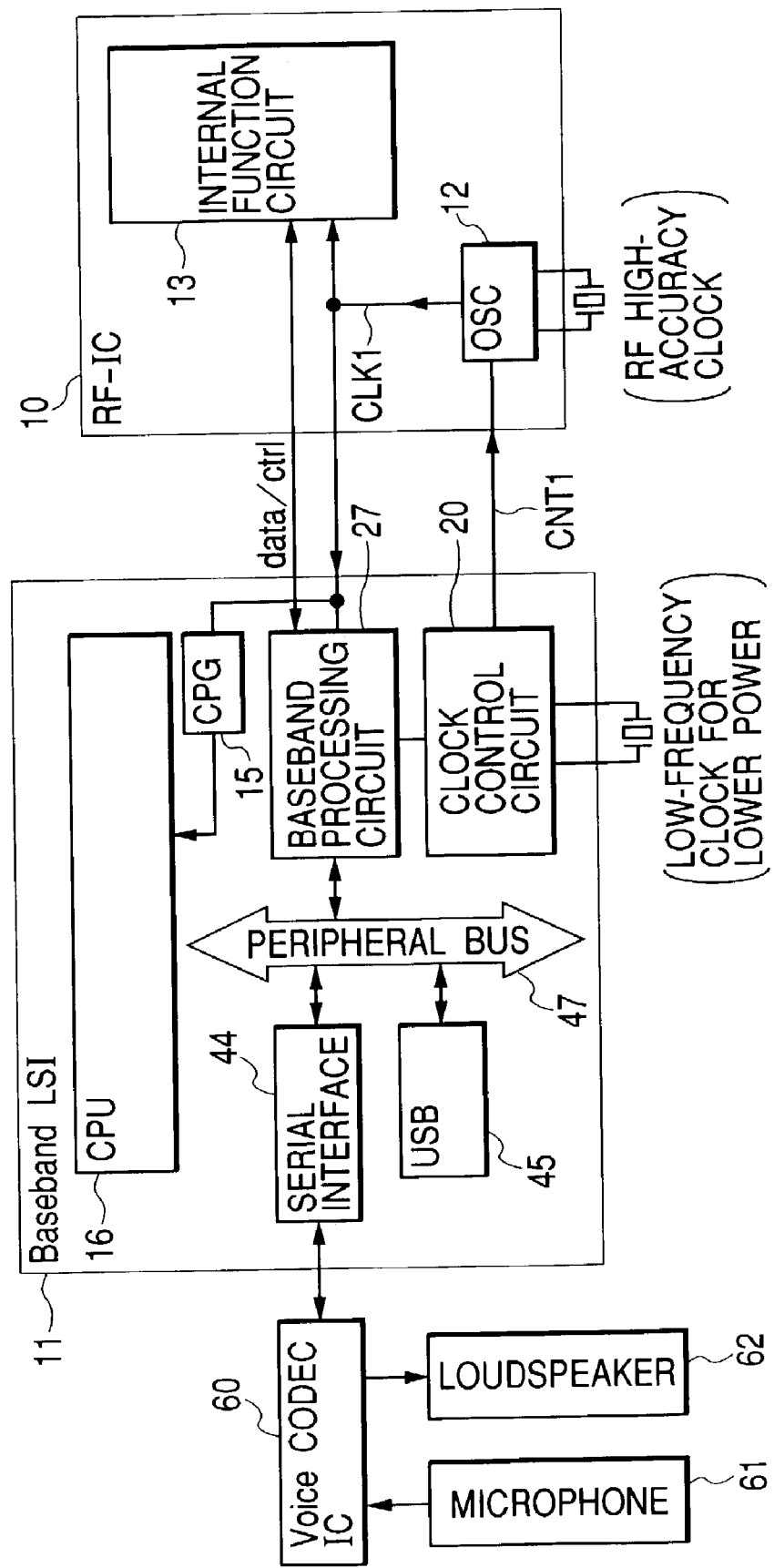
FIG. 14 is a block diagram showing an example of a concrete application of the Bluetooth system of FIG. 1 to a headset.

FIG. 14 shows an example of a concrete application of the Bluetooth system of FIG. 1 to a headset. The serial interface 44 allows voice CODEC (Coder-Decoder) and modem (modulator-demodulator) to be externally connected. This system is effective for voice transmission by Bluetooth and allows a connection between a microphone 61 and a loudspeaker 62 through the voice CODEC-IC 60. If voice is not inputted for a given period of time, the system shifts to the sniff state and waits in order to save power consumption. If voice is inputted, the system issues a DMA transfer request to the CPU 16 through the serial interface 44 and forcibly generates the clock signal CLK1 for resumption. The reactivated CPU 16 requests a master to shift from the sniff state to the active state. Conversely, in the case where, to the headset in the sniff state, PDA serving as a master sends voice indicating a call to a cellular phone as another slave, the master requests or commands the slave to shift to the active state.

Figure 15:
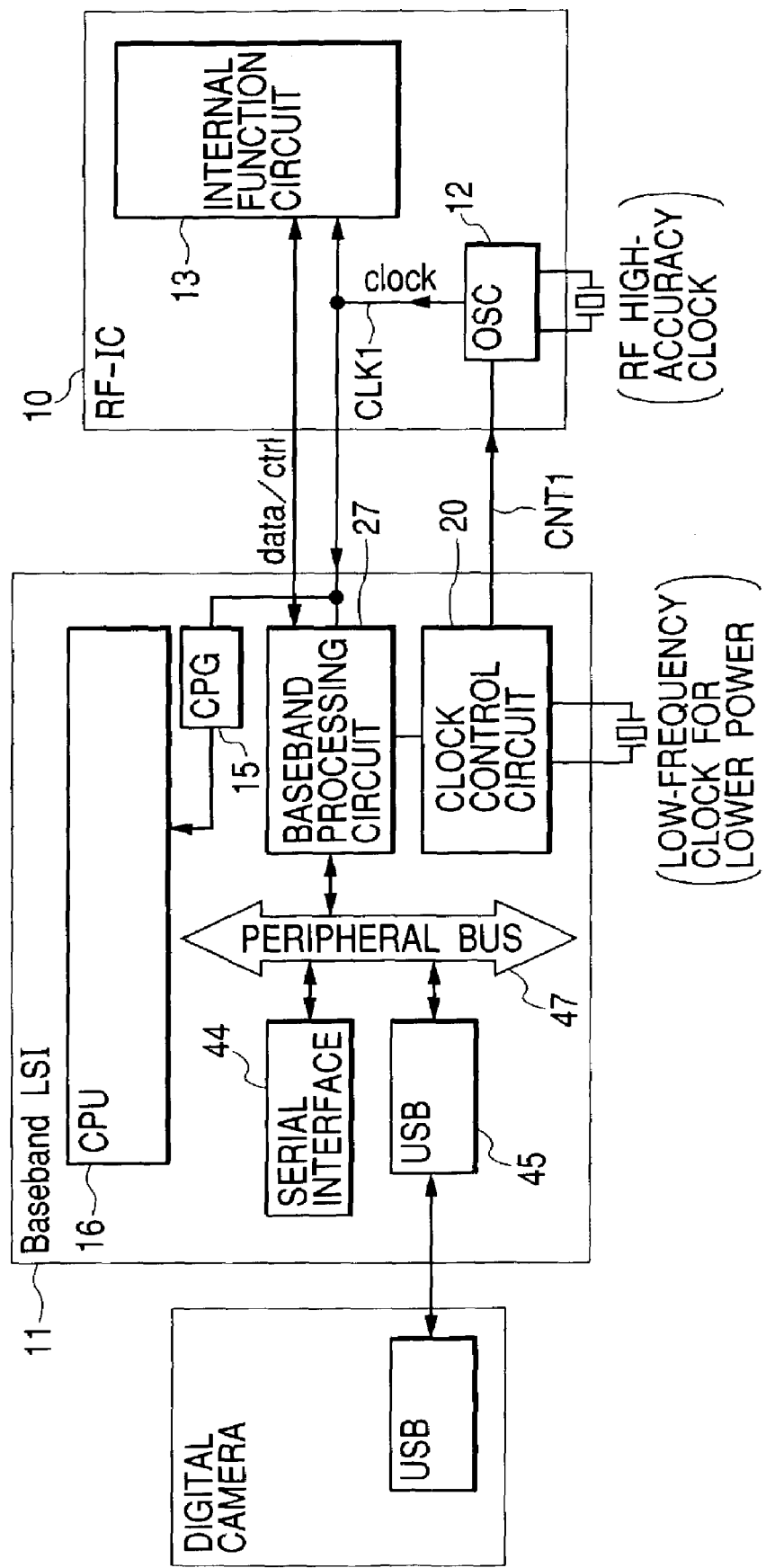
FIG. 15 is a block diagram showing an example that another device having a USB port is connected to a USB port of the Bluetooth system of FIG. 1.
Figure 16:
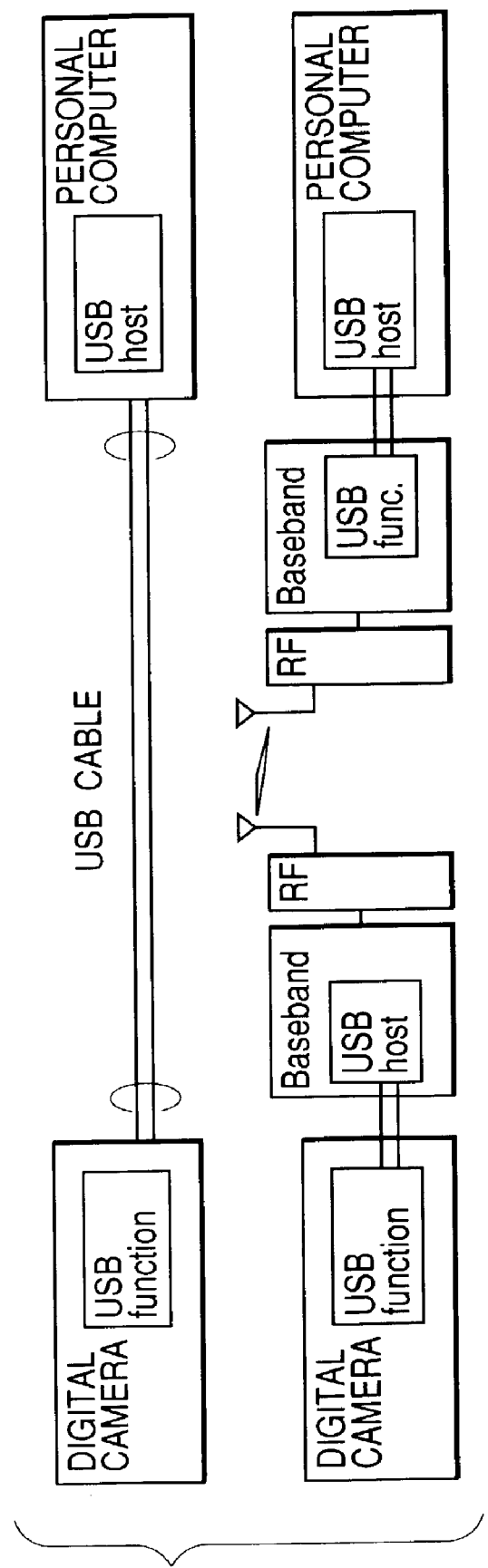
FIG. 16 is a diagram showing the relationship between a host and a function in the case where a connection between a personal computer and a printer through a USB cable is to be replaced by Bluetooth wireless connection.

FIG. 15 shows an example that another device having a USB port is connected to a USB port of the Bluetooth system of FIG. 1. In this example, a digital camera having a USB port is connected. USB has a host taking a true initiative, and a device connected to it, called a function. In the case where a personal computer and a digital camera are connected through USB, the personal computer is a host and the digital camera is a function. In the case where a connection between a personal computer and a printer through a USB cable is to be replaced by Bluetooth wireless connection, a host-to-function relationship is established as shown in FIG. 16.

Figure 17:
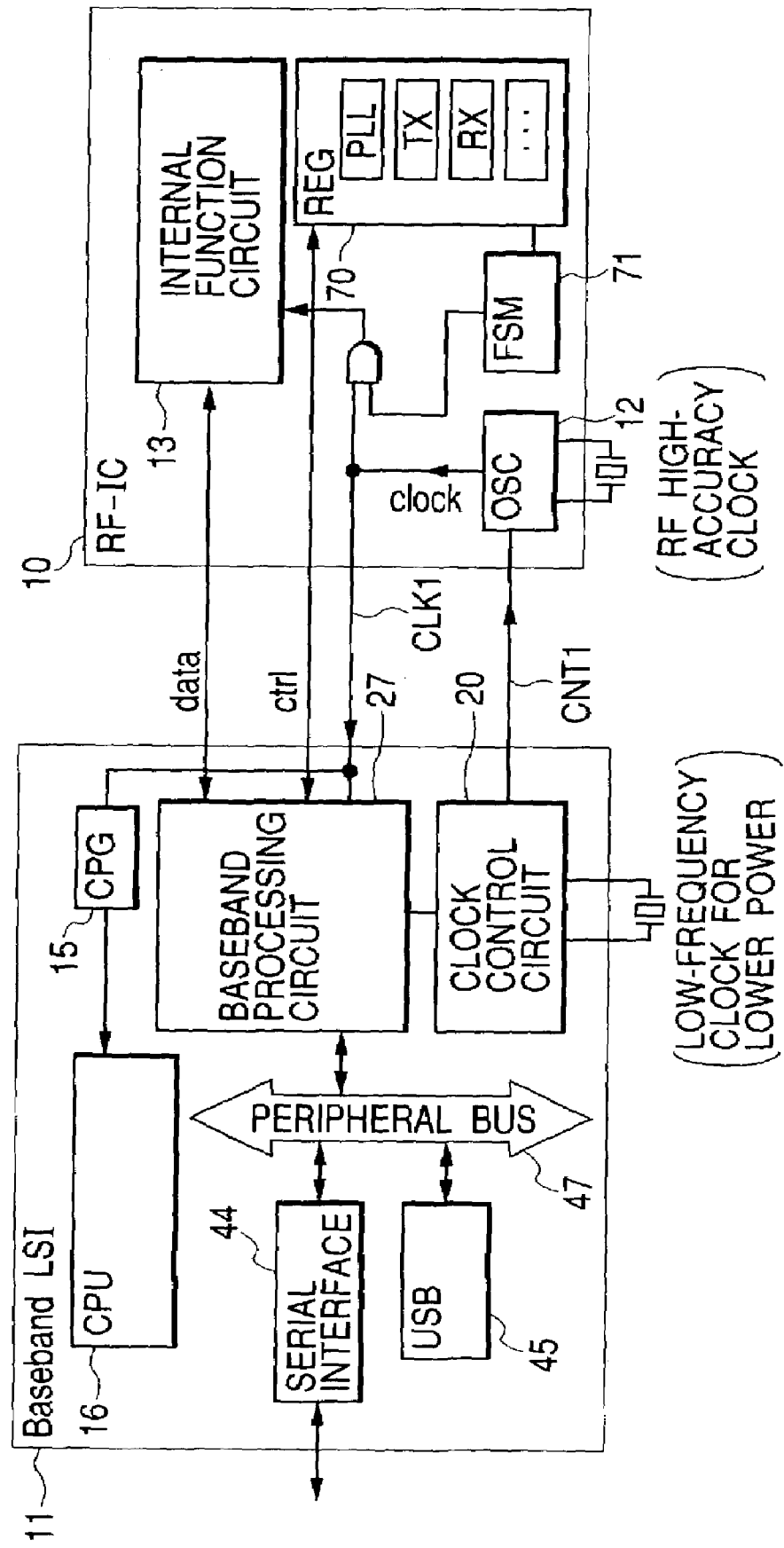
FIG. 17 is a block diagram showing details of the inside of the RF part with respect to a clock control system.
Figure 18:
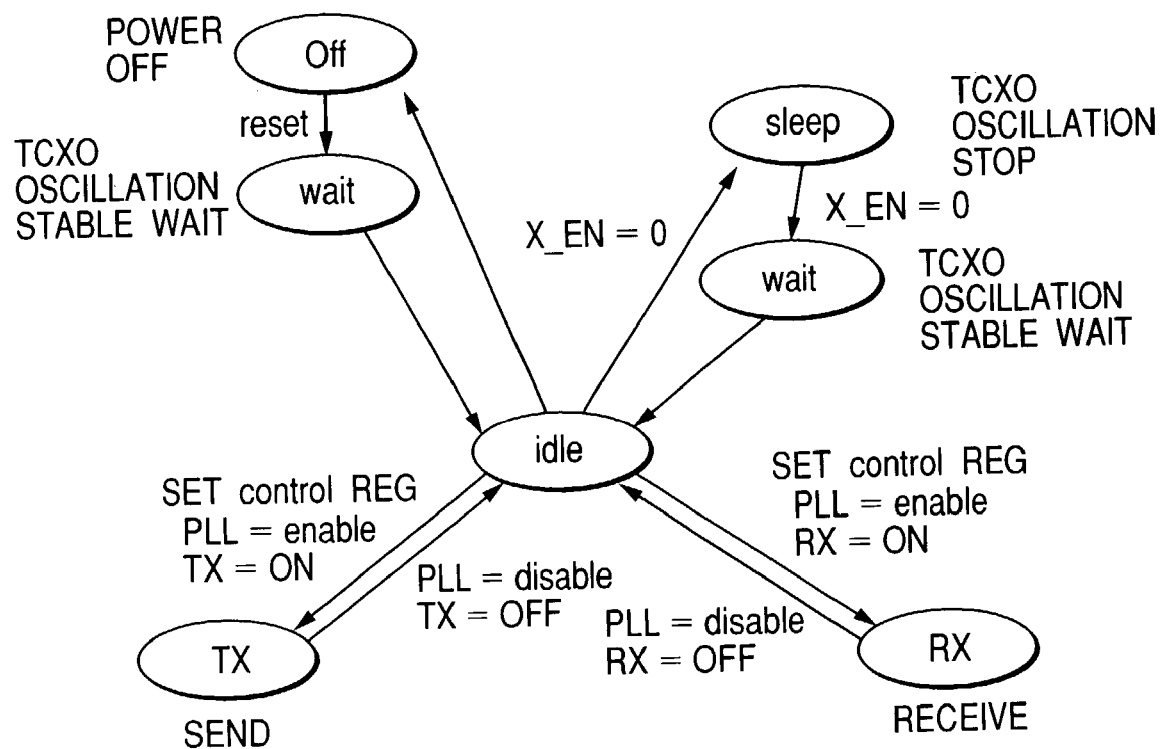
FIG. 18 is a diagram showing the state transition of control in the finite state machine in FIG. 17.

FIG. 17 shows a detailed example of the inside of the RF part 10 with respect to a clock control system. The configuration of the RF part 10 shown here is applicable to the concrete examples having been described so far. The RF part 10 is controlled based on a control signal ctrl from the baseband part 11 and the setting data of the register (REG) 70. In other words, state transition control is performed by a finite state machine (FSM) that shifts control states according to contents set in the register 70 and the contents of the control signal ctrl. A diagram showing the state transition of control in the finite state machine in FIG. 17 is as shown in FIG. 18.

Oscillation is turned on upon transition from power off to reset, and transition to the idle state occurs a given time after the oscillation becomes stable. In the idle state, neither sending nor receiving is performed, the internal circuits do not operate, and only access to the register 70 from the baseband part 11 is awaited. There occurs transition to a send state (TX), receive state (RX) or sleep state (sleep), depending on a state set in the register 70. In the sleep state, the oscillation of the oscillator circuit 12 is stopped and power consumption is minimized. A return from the sleep state is made by the control signal CNT1. Transition to the idle state (idle) occurs after it is awaited that oscillation becomes stable.

Operation effects described below are obtained from the Bluetooth communication device described above.

The baseband part 11 generates the second clock signal CLK2 and controls the generation and stop of the first clock signal CLK1, uses the first clock signal CLK1 to perform data processing and a clocking operation, and in a low power consumption state in which the first clock signal CLK1 is stopped, uses the second clock signal CLK2 to perform a timer operation and a clocking operation. Therefore, when the baseband part 11 issues a control signal for stopping the first clock signal CLK1 of the RF part 10, even if the supply of the first clock signal CLK1 from the RF part 10 to the baseband part 11 is stopped, the baseband part 11 can generate a generation timing of the first clock signal CLK1 by a timer operation using the second clock signal CLK2. Furthermore, since the timer operation uses the second clock signal CLK2 with which the clocking operation is performed, the clock reactivation can be easily timed to other operations based on the shared clock.

The central processing unit (16) possessed by the baseband part 11 operates in synchronization with an operation clock signal formed based on the first clock signal. Therefore, the central processing unit has the economical advantage that it does not need to have an operation reference clock signal source of its own.

The baseband part 11 has a register 42 for making a generation timing of the first clock signal CLK1 by the timer 40 variable; the register 42 is accessible to the central processing unit 16. Thereby, according to the setting value of the register 42, the interval from the low power consumption state in which the first clock signal CLK1 is stopped to the reactivation of the clock can be made variable.

Since a reset to the inside of the baseband part is released after the first clock signal CLK is generated to a predetermined state by the reset, in the case where the baseband part adopts the synchronous reset system that presupposes that a clock signal is stably supplied before reset release, even if the same reset signal as the RF part 10 is supplied to the baseband part 11, it can be prevented that the baseband part 11 malfunctions in the period during which the first clock signal CLK1 oscillates unstably.

The invention made by the inventor has been described based on preferred embodiments. It goes without saying that the present invention is not limited to the embodiments and may be changed in various ways without departing from the scope and sprit of the present invention.

For example, the frequency 13 MHz of the RF clock signal (first clock signal CLK1) and the frequency 3.2 kHz of the low-frequency clock signal (second clock signal) are only examples and may be properly converted by a frequency divider, frequency multiplier, or other circuits. The positive/negative logic of signals shown in the circuit diagrams and the block diagrams may be freely selected as required. The present invention may be applied not only to Bluetooth systems but also to wireless LAN (Local Area Network) systems or terminal equipment.

Representative examples of the invention disclosed in this patent application will now be briefly described.

When a control signal for stopping the first clock signal of the RF part is issued from the baseband part operating on the same clock signal as it, even if the supply of the first clock signal from the RF part to the baseband part is stopped, the baseband part can generate a generation timing of the first clock signal by a timer operation using the second clock signal. Furthermore, since the timer operation uses the second clock signal with which the clocking operation is performed, the clock reactivation can be self-reliantly timed to the outside.

What is claimed is:

1. A wireless communication device applicable to a wireless communication network, comprising:
    an RF part for performing wireless communications; and
    a baseband part interfaced to the RF part and performing data processing,
    wherein the RF part generates a first clock signal,
    wherein the baseband part generates a second clock signal, controls start and stop of generation of the first clock signal, uses the first clock signal to perform data processing and a clocking operation, uses the second clock signal to perform a timer operation and a clocking operation in a low power consumption state in which the first clock signal is stopped, and generates a generation timing of the first clock signal by the timer operation,
    wherein the baseband part has a central processing unit for performing the data processing, and the central processing unit operates in synchronization with an operation clock signal which is formed based on the first clock signal,
    wherein when a control signal for stopping the first clock signal of the RF part is issued from the baseband part, even if supply of the first clock signal from the RF part to the baseband part is stopped, the baseband part generates a generation timing of the first clock signal by a timer operation using the second clock signal, and
    wherein since the timer operation performed by the baseband part uses the second clock signal with which the clocking operation is performed, clock reactivation of the first clock signal can be timed to other operations based on a shared clock signal.

2. The wireless communication device according to claim 1, wherein the RF part has a temperature-compensated clock signal oscillation source for generating the first clock signal, and
    wherein the baseband part has a clock oscillation source for generating the second clock signal with a lower accuracy than the clock oscillation source of the first clock signal.

3. The wireless communication device according to claim 1, wherein the clocking operation is an operation for a master communication device and slave communication devices participating in the network to share a virtual clock.

4. The wireless communication device according to claim 3, further comprising a counter for performing the counting operation.

5. The wireless communication device according to claim 3, wherein the network is piconet of a Bluetooth system.

6. The wireless communication device according to claim 1, wherein the RF part has plural finite state transition control registers of wireless communication operation accessed by the central processing unit and predetermined finite state transition control registers can selectively store control information indicating the stop of the supply of the first clock signal to internal circuits of the RF part.

7. The wireless communication device according to claim 6, wherein the baseband part has a timer for performing the timer operation and a register for making the generation timing of the first clock signal by the timer variable, the register being accessible to the central processing unit.

8. The wireless communication device according to claim 1, wherein the RF part starts the generation of the first clock signal in synchronization with reset release by a reset signal inputted to a reset terminal, and
    wherein the baseband part is supplied with the reset signal, holds a reset indication by the reset signal in a holding means, and releases the held reset indication after a clock generation state of the first clock signal reaches a predetermined state.

9. The wireless communication device according to claim 8, wherein the holding means is a counter that is initialized by the reset signal, counts clock changes of the first clock signal, and instructs an internal reset signal to release the reset when a count value reaches a predetermined value.

10. A microcomputer put into a semiconductor integrated circuit that inputs a first clock signal from the outside and performs baseband processing for wireless communications, comprising:
    a central processing unit;
    baseband processing circuits connected to an RF part;
    a clock generation circuit;
    a clock control circuit; and
    a timer,
    wherein the central processing unit operates with a clock signal generated based on the first clock signal being as an operation reference clock signal,
    wherein the clock generation circuit generates a second clock signal,
    wherein the clock control circuit outputs a control signal for controlling start and stop of generation of the first clock signal,
    wherein the baseband processing circuits use the first clock signal to perform a clocking operation, and when the first clock signal is stopped, use the second clock signal to perform a clocking operation,
    wherein the timer, when the first clock signal is stopped, generates a generation timing of the first clock signal from the second clock signal, and affords the timing to the clock control circuit,
    wherein the baseband processing circuits have a central processing unit for performing data processing, and the central processing unit operates in synchronization with an operation clock signal which is formed based on the first clock signal,
    wherein when a control signal for stopping the first clock signal of the RF part is issued from the baseband part, even if supply of the first clock signal from the RF part to the baseband part is stopped, the baseband part generates a generation timing of the first clock signal by a timer operation using the second clock signal, and
    wherein since the timer operation performed by the baseband part uses the second clock signal with which the clocking operation is performed, clock reactivation of the first clock signal can be timed to other operations based on a shared clock signal.

11. The microcomputer according to claim 10,
wherein the clocking operation is an operation for a master communication device and slave communication devices participating in a network to share a virtual clock.

12. The microcomputer according to claim 11, comprising:
a counter for performing the clocking operation.

13. The microcomputer according to claim 11,
wherein the network is a Bluetooth piconet.

14. The microcomputer according to claim 10, further comprising:
a register for making the generation timing of the first clock signal by the timer variable, the register being accessible to the central processing unit.

* * * * *